(12) United States Patent
Choi et al.

(10) Patent No.: US 8,577,308 B2
(45) Date of Patent: Nov. 5, 2013

(54) BEAMFORMER AND BEAMFORMING METHOD

(75) Inventors: Sung-Tae Choi, Hwaseong-Si (KR);
Jung-Han Choi, Hwaseong-Si (KR);
Young-Hwan Kim, Hwaseong-Si (KR);
Dong-Hyun Lee, Seongnam-Si (KR);
Hong-Yi Kim, Daejeon-Si (KR);
Ki-Chan Eun, Daejeon-Si (KR);
Chul-Soon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1109 days.

(21) Appl. No.: 12/268,627

(22) Filed: Nov. 11, 2008

(65) Prior Publication Data

US 2009/0270051 A1  Oct. 29, 2009

(30) Foreign Application Priority Data

Apr. 25, 2008  (KR) .................. 10-2008-0039041

(51) Int. Cl.
*H04B 7/06*  (2006.01)

(52) U.S. Cl.
CPC ................................. *H04B 7/0617* (2013.01)
USPC .......................................... 455/101; 455/129

(58) Field of Classification Search
USPC .................. 455/13.1, 13.3, 101, 550.1, 562.1,
455/272.1, 277.1, 115.1, 129; 343/353,
343/354, 368, 373; 370/334; 342/353, 354,
342/368, 373
See application file for complete search history.

(56) References Cited

U.S. PATENT DOCUMENTS

| 5,550,550 A * | 8/1996 | Das .............................. 455/13.3 |
| 6,340,948 B1 * | 1/2002 | Munoz-Garcia et al. ..... 342/373 |
| 7,315,279 B1 * | 1/2008 | Milbourne ................. 455/562.1 |
| 2002/0054580 A1 * | 5/2002 | Strich et al. ................... 370/334 |

\* cited by examiner

*Primary Examiner* — Thanh Le
(74) *Attorney, Agent, or Firm* — Sughrue Mion, PLLC (57) ABSTRACT

Disclosed are a beamformer and a beamforming method. The beamformer includes a plurality of dividers, each of which divides an input signal along a plurality of paths, an input switch which selects one of the dividers such that the input signal is input to the selected divider, a phase shifter which shifts phases of respective output signals from the divider, and an output switch which transmits the output signals from the phase shifter to an antenna.

21 Claims, 7 Drawing Sheets

BEAMFORMER AND BEAMFORMING METHOD

CROSS REFERENCE TO RELATED APPLICATIONS

This application claims the benefit under 35 U.S.C. §119(a) of Korean Patent Application No. 10-2008-0039041, filed on Apr. 25, 2008, the disclosure of which is incorporated herein in its entirety by reference.

TECHNICAL FIELD

The following description relates to a smart antenna system, and more particularly, to a beamformer and a beamforming method.

BACKGROUND

In a mobile communications system, wireless channel characteristics such as co-channel interference signals between or within cells, multipath fading, and the Doppler effect degrade the performance and capacity of the system. A smart antenna technology is used to increase the overall system capacity to counteract such causes of performance degradation. A smart antenna technology is the combination of array antennas formed of multiple antenna sensors spaced a part from each other at predetermined distances and a baseband signal processing technique, and provides more freedom of design by adding spatial processing capability to the system, thereby enhancing the overall system performance.

One of main functions of the smart antenna technology is beamforming. A beamforming technology is for creating the radiation pattern for a beam to direct in a particular direction, and includes a switched beamforming technique and an adaptive beamforming technique.

The switched beamforming technique uses a fixed set of weighting vectors for a number of directions, and the adaptive beamforming technique updates weighting vectors in accordance with the desired directions in order to maximize the ratio of the wanted signal to an interference signal.

Furthermore, the beamforming technology generally uses Butler matrix or Rotman lens. The former has the advantage of easy implementation when forming a small number of beams, whereas it has the disadvantages of complexity of the structure and the high manufacturing cost since it needs more hybrid couplers, fixed phase shifters, and crossovers as the number of beams to be formed increases.

On the other hand, the latter has the advantage of no limitation in the number of beams to be formed, a low manufacturing cost and operation in a wider band, whereas it has the disadvantage of poor precision in design of a focal arc, an array curve, constrained lines, and so on.

SUMMARY

There are provided a beamformer, which may reduce signal loss and simplify its structure, and a beamforming method.

According to another aspect, there is provided a beamformer comprising a plurality of dividers, each of which divides an input signal along a plurality of paths, an input switch, which selects one of the dividers such that the input signal is input to the selected divider, a phase shifter, which shifts phases of respective output signals from the divider, and an output switch, which transmits the output signals from the phase shifter to an antenna.

The phase shifter may be formed in a multilayer structure in which a plurality of substrates are stacked on one another, a plurality of transmission lines through which the output signals flow being formed on each substrate. The phase shifter may change the phase of each output signal from the divider according to the length of the each transmission line while the output signal is flowing in the transmission line. For instance, the dividers may be located respectively in correspondence to the plurality of substrates in such a manner that each divider is connected to the transmission lines formed on a substrate to which the divider corresponds, and the output signals from the phase shifter may have different phases from one anther, or have an equal phase interval.

The transmission lines may use various forms of transmission line such as microstrip lines or coplanar waveguide lines.

The output switch may select only signals that have passed the transmission lines on the same layer, and transmit the selected signals to the antenna.

Each divider may be an N-way power divider that equally divides the power of the input signal to generate N output signals.

According to still another aspect, there is provided a beamformer formed by overlaying two or more of the beamformers described above to provide double polarization or a variable beamwidth. For instance, two or more of the beamformers described above may be stacked on one another.

According to yet another aspect, there is provided a beamformer comprising a plurality of dividers, each of which divides an input signal along a plurality of paths, and a phase shifter, which has a plurality of substrates stacked on one another, each substrate having transmission lines formed thereon for output signals from the divider to flow through, and which changes the phase of each output signal according to the length of each transmission line.

The beamformer may further comprise an input switch, which selects one of the plurality of dividers, and an output switch, which selects only signals that have passed through the same layer, and which transmits the selected signals to an antenna.

The dividers may be located respectively in correspondence to the plurality of substrates in such a manner that each divider is connected to the transmission lines formed on a substrate to which the divider corresponds. Each divider may be an N-way power divider that equally divides the power of the input signal to generate N output signals.

According to another aspect, there is provided a beamformer comprising a plurality of substrate, a divider unit, which is disposed on each of the substrates, and which divides an input signal along a plurality of paths, a phase shifting unit disposed on each of the substrates, which is connected to the divider unit, and which changes the phase of an output signal from the divider unit, and a switch unit that selects one of the substrates.

According to another aspect, there is provided a beamforming method comprising selecting one of a plurality of dividers, each of which divides an input signal along a plurality of paths to generate a plurality of output signals, outputting the input signal into a plurality of paths to generate a plurality of output signals, and changing the phase of each of the generated output signals.

Other features will become apparent to those skilled in the art from the following detailed description, which, taken in conjunction with the attached drawings, discloses embodiments of the invention.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be apparent to those of ordinary skill in the art. Descriptions of well-known functions and constructions are omitted to increase clarity and conciseness.

Figure 1:
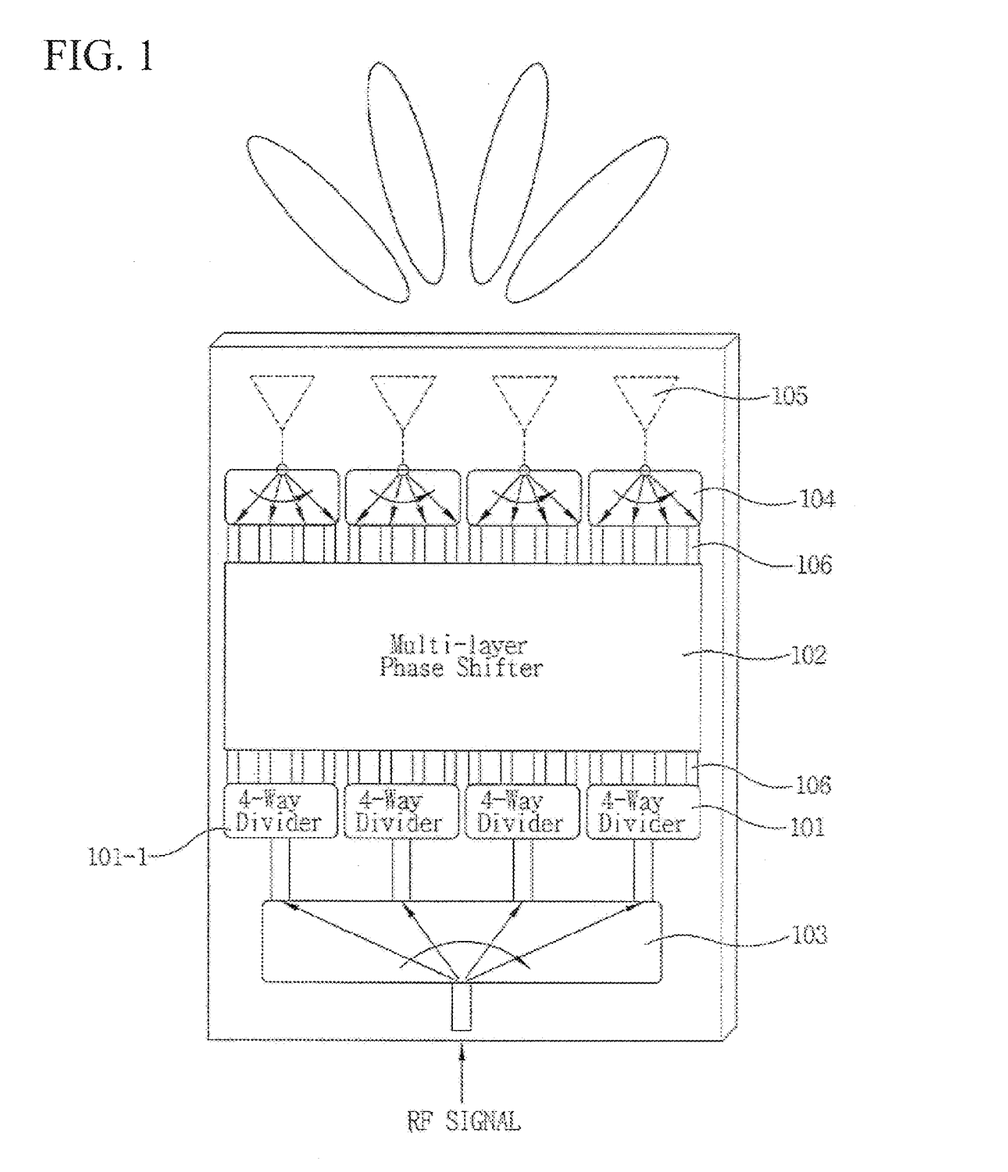
FIG. 1 is a view schematically showing a beamformer according to an embodiment.

FIG. 1 is a view schematically showing a beamformer according to an embodiment. Referring to FIG. 1, the beamformer may include a plurality of dividers 101, a phase shifter 102, an input switch 103, an output switch 104, and a transmitting/receiving antenna 105.

When a high-frequency signal is input to the input switch 103, the input switch 103 selects one of the plurality of dividers 101, and provides the signal to the selected divider (for example, a divider 101-1). The input switch 103 may select the divider according to the intended use. For instance, a predetermined control unit may receive a command from a user, and may generate a signal for controlling the input switch 103 in response to the command.

For example, it is assumed that the input switch 103 selects a first divider 101-1. Then, an input signal passing through the first divider 101-1 is divided along several paths (for example, four paths) into several outputs, which are then input to the phase shifter 102. Each divider 101 may be an N-way power divider which divides the power of the input signal equally to generate N output signals. Thus, the signal passing through the first divider 101-1 is divided into four, each of which is input to the phase shifter 102.

The phase shifter 102 shifts the phase of the signal input from the divider 101. To this end, the phase shifter 102 includes a transmission line 106 through which the signal output from the divider passes. Since the divider 101 divides the input signal along the plurality of paths to generate a plurality of outputs, the phase shifter 102 may have a plurality of transmission lines 106.

The time spent for the signal output from the divider 101 to pass through the transmission line 106 increases with the length of the transmission line 106. In other words, the signal has a certain delay in passing through the transmission line 106 according to the length of the corresponding transmission line 106, and thus the transmission lines length differences create phase differences between the signals having passed the transmission lines 106. According to such principle, if the lengths of the transmission lines 106 formed in the phase shifter 102 are adjusted adequately, the signals that have passed through the transmission lines 106, that is, the output signals from the phase shifter 102 can have their phase shifted.

For example, it is possible to adequately adjust the lengths of the transmission lines 106 for each of the output signals to have a phase distance of 0°, 90°, 180°, and −90°, respectively.

Moreover, to shift the phase of the signal output from the divider 101, in addition to, or in lieu of, changing the length of the transmission line 106, the phase shifter 102 may include an element for directly changing the phase of the signal.

At an output end (i.e. an end opposite to an end connected to the divider 101) of the transmission line 106, the output switch 104 is placed, and the output switch 104 transmits the output signal from the transmission line 106 to the transmitting/receiving antenna 105.

The initial high-frequency signal is divided along a plurality of paths by the divider 101, the divided signals are input to the phase shifter 102, and then the phase shifter 102 shifts the phases of the divided signals. The signals output from the phase shifter 102 with predetermined phase differences therebetween are provided to the transmitting/receiving antenna 105, and thus a particular beam pattern is created.

Figure 2:
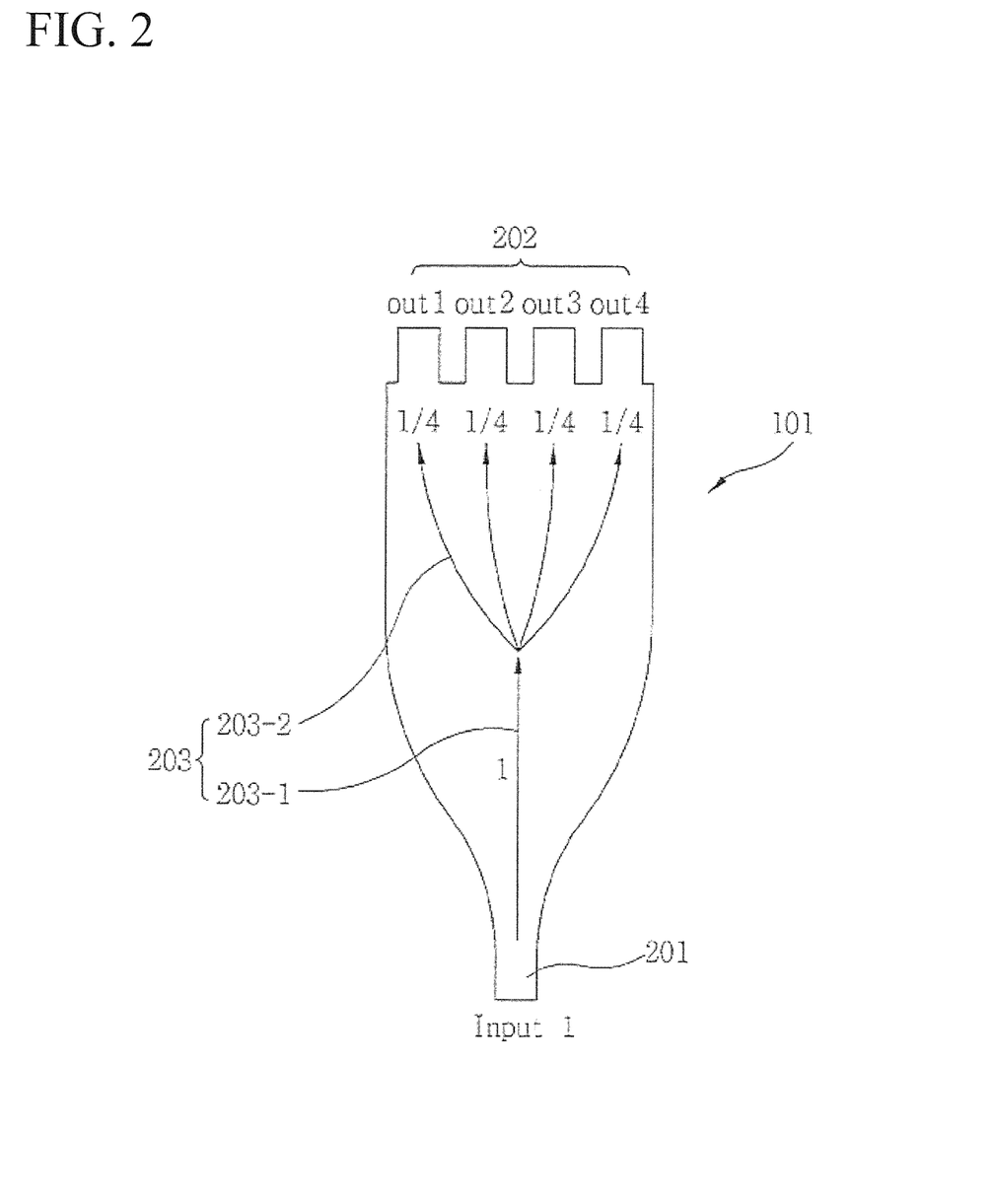
FIG. 2 is a view showing a divider according to an embodiment.

FIG. 2 is a view showing the divider 101 of FIG. 1 according to an embodiment. The divider 101 in FIG. 2 is a four-way power divider, which splits the power of the input signal to four paths, and which then outputs the split signal as four outputs.

Referring to FIG. 2, each divider 101 includes an input end 201 to which a signal is input, a strip line 203 which splits the input signal into a plurality of paths, and an output end 202 from which the split signals are output.

The strip line 203 through which the signals pass may consist of an input line 203-1 connected to the input end 201, and an output line 203-2 formed by splitting the input line 203-1 in four, each of which is connected to the output end 202.

The signal input from the input end 201 is equally power-divided while passing through the input line 203-1 and the output line 203-2, and then is output to the output end 202. For example, when it is assumed that the power of the input signal is 1, the input signal is divided along the strip line 203 into four output signals each having a quarter of the original power of the input signal.

Figure 3:
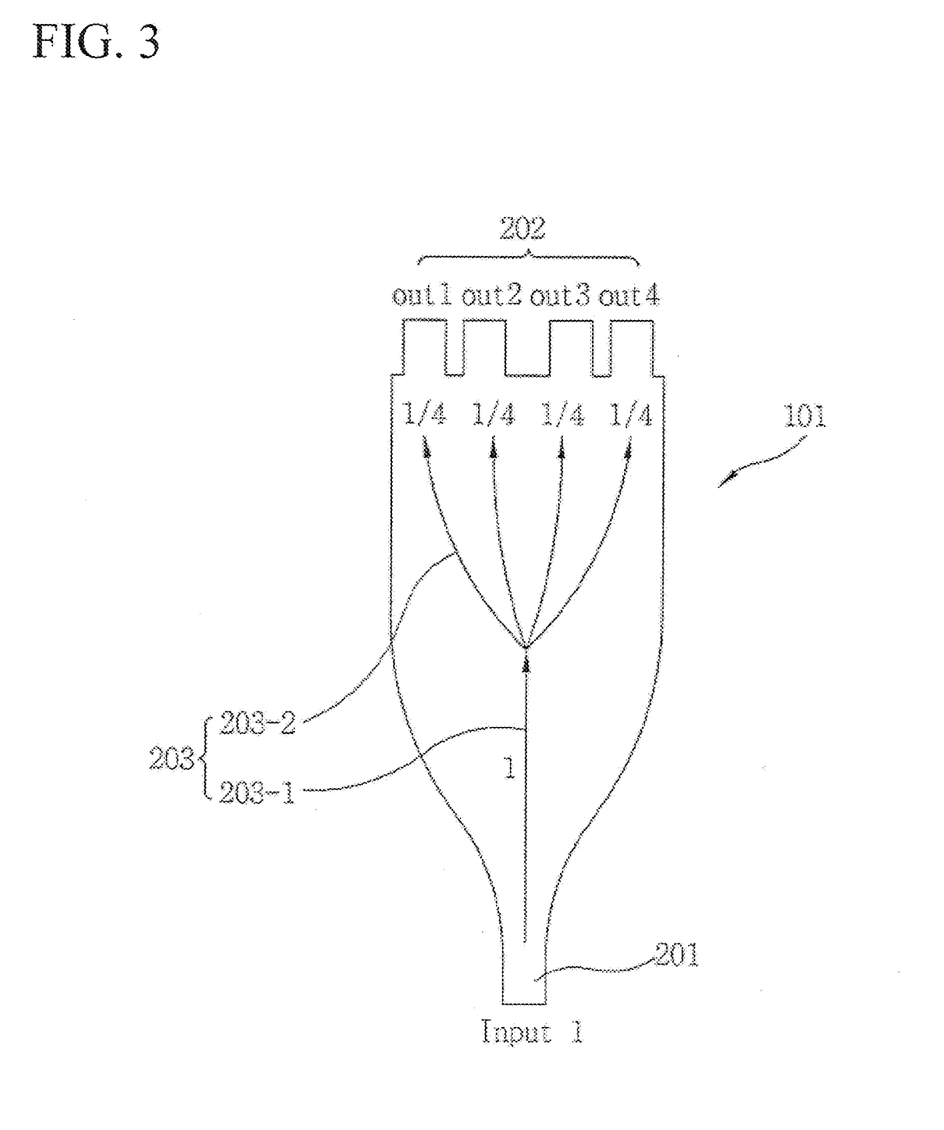
FIG. 3 is a view showing a divider according to another embodiment.

FIG. 3 is a view showing another example of the divider 101 of FIG. 1 according to an embodiment. Although the output end 202 in FIG. 2 has gaps equally spaced thereon, the output end 202 may have gaps spaced at different distances from one another thereon. A gap between center-placed output ends (out2 and out3) may be formed to be wider than the other gaps (out1-out2, out3-out4) between the output ends.

Figure 4:
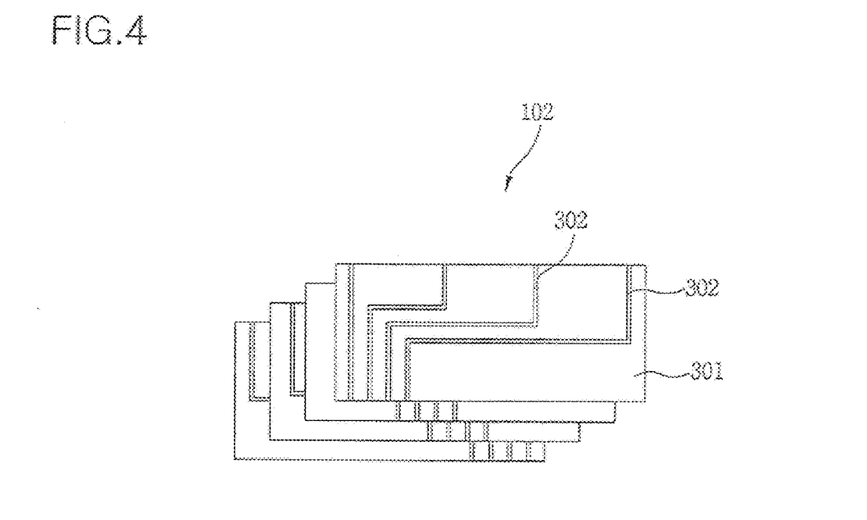
FIG. 4 is a view of a phase shifter according to an embodiment.
Figure 5:
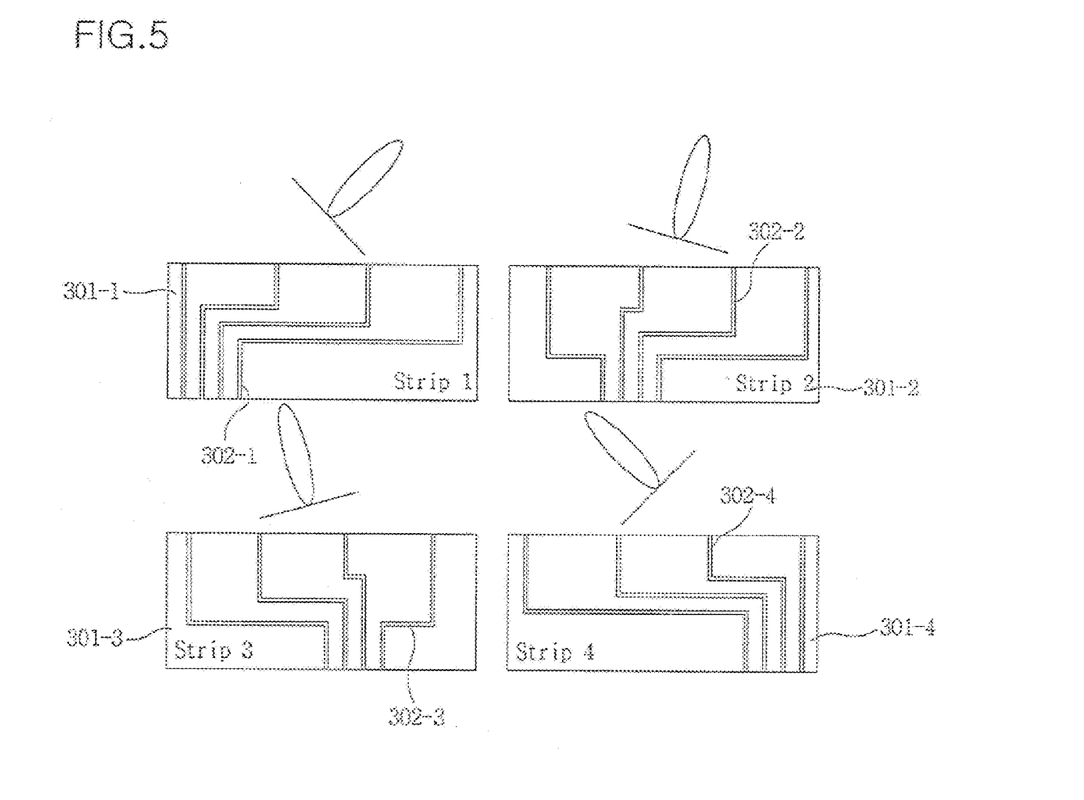
FIG. 5 is an exploded view of the phase shifter in FIG. 4.

FIGS. 4 and 5 are views of the phase shifter 102 of FIG. 1 according to an embodiment. Referring to FIGS. 4 and 5, the phase shifter 102 is formed in a multilayer structure in which multiple substrates 301 are stacked atop one another. Each substrate 301 has several transmission lines 302 formed thereon.

The transmission lines 302 may be various forms of transmission lines such as microstrip lines or coplanar waveguide (CPW) lines formed on a dielectric. Also, the multilayered phase shifter 102 may be fabricated by the use of multilayer printed circuit board (PCB) process or low temperature co-fired ceramic (LTCC) process.

The phase shifter 102 is formed of, for example, four substrates 301 stacked atop one another, and four transmission lines 302 formed on each substrate 301. One end of each transmission line 302 is connected to the output end 202 (referring to FIG. 2) of the divider 101 described above.

Figure 6:
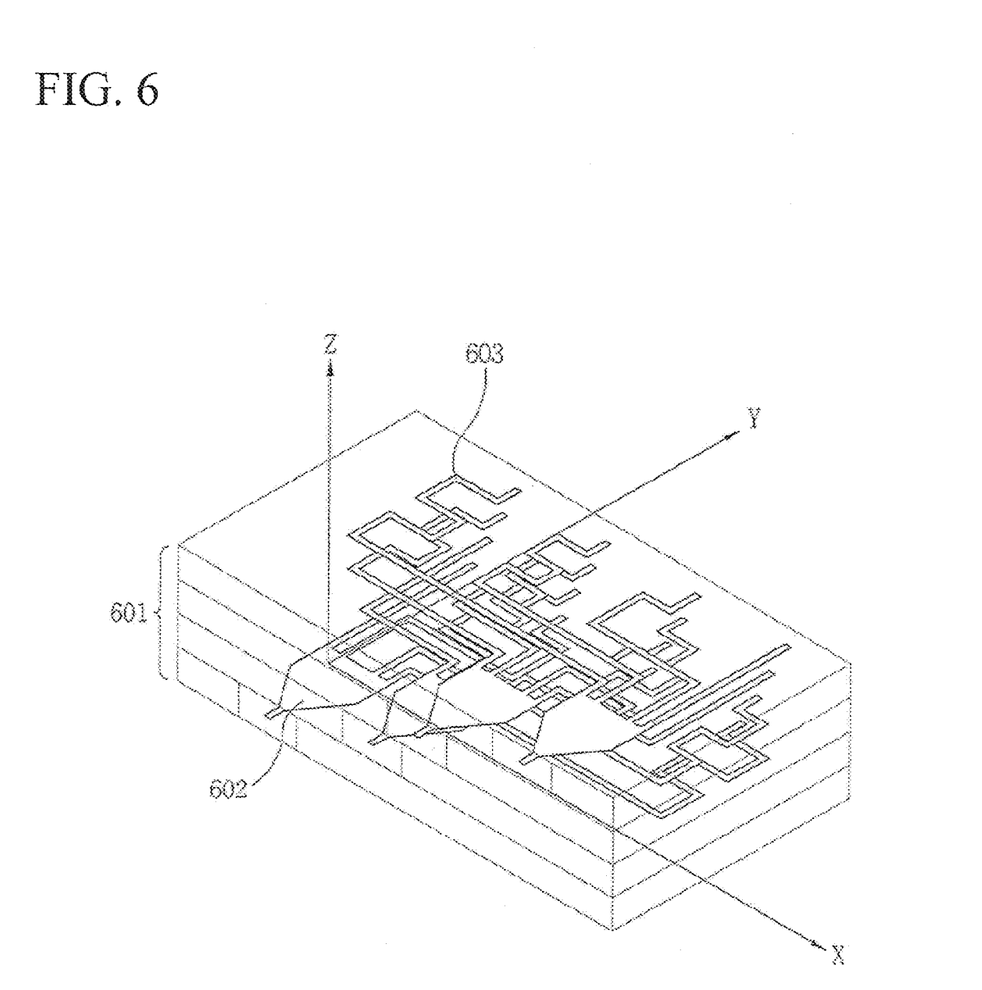
FIG. 6 is a view of a beamformer according to another embodiment.

In this case, all the transmission lines 302 formed on the same layer or the same substrate are connected to the output end 202 of the same divider 101. That is, the dividers 101 are connected to respective layers through the transmission lines 302 disposed on each of the layers. For example, as shown in FIG. 5, it is assumed that four dividers 101 (referring to FIG. 1) are connected to four substrates 301, each of which has four transmission lines 302 thereon. Also, it is assumed that the each divider 101 has four output ends. The transmission lines 302-1 on the first substrate 301-1 forming the phase shifter 102 are connected to the first divider 101-1 of FIG. 1. The transmission lines 302-2 on the second substrate 301-2 are connected to the second divider 101-2 of FIG. 1, and the rest of the transmission lines are connected to the dividers in the same manner (e.g., as illustrated in FIG. 6).

The transmission lines 302 on the each substrate 301 may be formed different from one another such that signals that have passed through the transmission lines 302 can have an equal phase interval. For instance, the length of the transmission line 302 for obtaining a desired angle of an antenna beam can be calculated by Equation 1 below.

$$L = d \times \tan \theta \quad \text{(Equation 1)}$$

In Equation 1, L represents the length of the transmission line 302, d represents a distance between the transmitting/receiving antennas 105, and θ denotes a desired tilting angle of the beam.

As described above, the input switch 103 selects one of the dividers 101. Thus, when the input switch 103 selects the first divider 101-1, the input signal is divided along several paths while passing through the first divider 101-1, and the divided signals flow along the transmission lines 302-1 on the first substrate 301-1. In other words, it can be understood that a layer along which the signal is to flow is selected by the input switch 103.

The correlation between the input switch 103 and the output switch 104 will now be described with reference to FIG. 1.

The input switch 103 and the output switch 104 may share a predetermined switch control signal together. For instance, if the input switch 103 selects the first divider 101-1, the output switch 104 may switch channels between the transmitting/receiving antennas 105 and the phase shifter 102 in order to select only the signals output from the first divider 101-1.

In other words, the phase relations between the final output signals can vary depending on which substrate is used among the several substrates, and the input switch 103 and the output switch 104 can select the substrate.

FIG. 6 is a view of a beamformer according to another embodiment. Referring to FIG. 6, the beamformer includes a plurality of substrates 601, multiple dividers 602, and several transmission lines 603.

The dividers 602 and the transmission lines 603 are disposed on the substrate 601. Moreover, the plurality of substrates 601 are stacked atop one another. A dielectric such as a silicon substrate may be used for the each substrate 601, and metal material may be used for the dividers 602 and the transmission lines 603 such that electronic signals can flow through the dividers 602 and the transmission lines 603. For example, each divider 602 may be an N-way power divider that splits the power of a signal into N paths, and various forms of transmission lines such as microstrip lines or CPW lines may be used for the transmission lines 603.

Although not illustrated in detail in FIG. 6, as described above, the beamformer may further include an input switch for selecting one of the dividers 602, and output switches for selecting output signals from the transmission lines 603 to provide the signals to a transmitting/receiving antenna.

For instance, if the input switch selects the uppermost dividers 602, an input signal is input to the uppermost divider 602 to be divided along four paths, and then the divided signals flow along the topmost transmission lines 603. At this time, the length of each transmission line 603 is determined by Equation 1 such that the signals having passed through the transmission lines 603 can have an equal phase interval. As the input switch has chosen the uppermost divider 602, the output switch selects and transmits to the transmitting/receiving antenna the signals that have passed through the uppermost divider 602.

The input switch selects the divider according to the particular intended use. For instance, the lengths of the transmission lines on the topmost substrate are set such that signals that have passed through the uppermost substrate have a phase interval of 90°, and the lengths of the transmission lines on the bottom substrate are set such that signals that have passed through the bottom surface have a phase interval of 60°. Thus, when output signals having a phase interval of 90° are needed, the uppermost substrate is selected, and when output signals having a phase interval of 60° are needed, the bottom substrate is selected.

Figure 7:
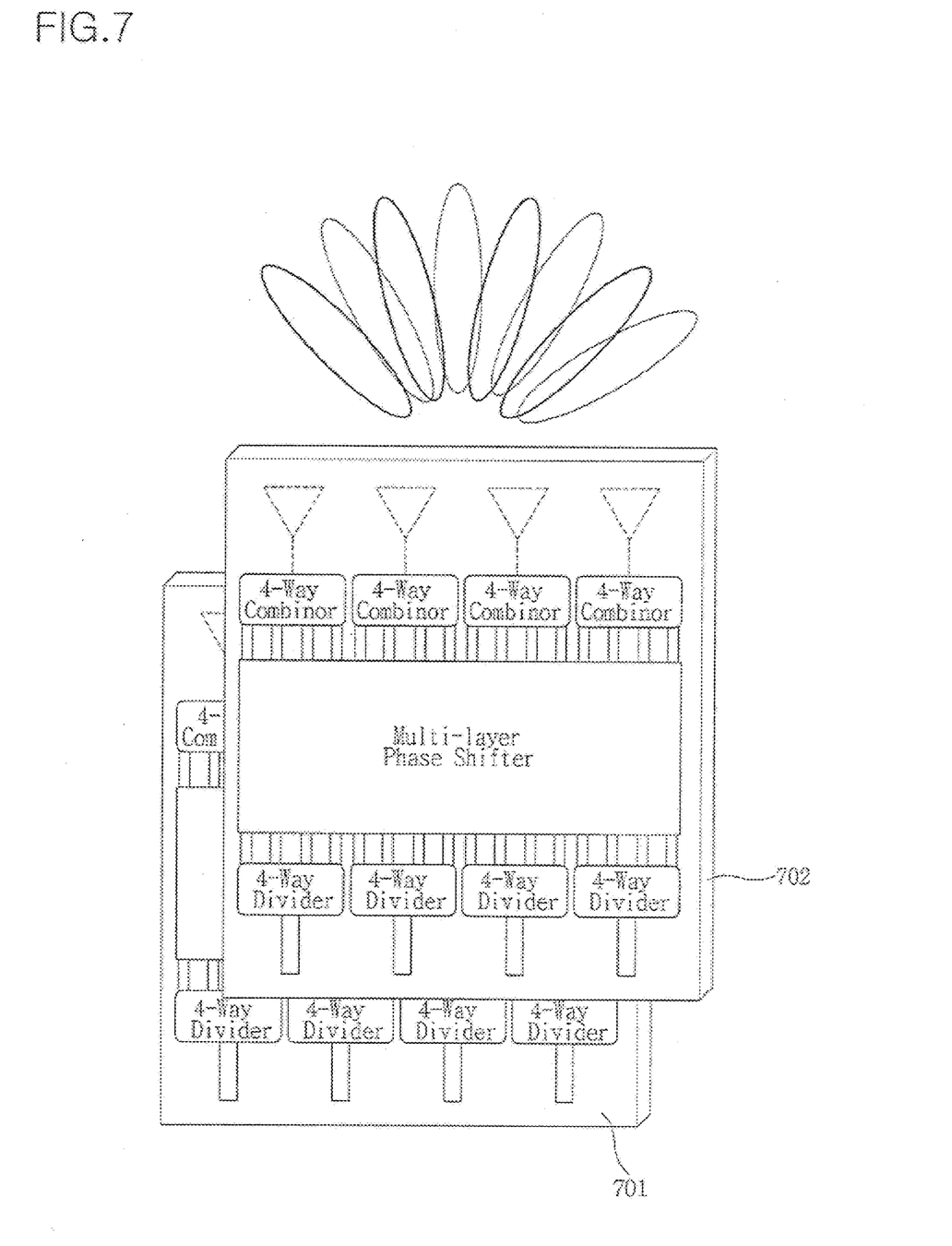
FIG. 7 is a view of a beamformer according to another embodiment.

FIG. 7 is a view showing a beamformer according to anther embodiment. In FIG. 7, two or more beamformers in accordance with the embodiment are overlaid one another to provide dual polarization or variable beamwidth.

Referring to FIG. 7, two beamformers 701 and 702 are stacked on each other. For example, the upper beam former 702 provides vertical polarization, and the lower beamformer 701 provides horizontal polarization, and thus double polarization can be achieved as a whole. Also, when the phase intervals of the upper beamformer 702 and the lower beamformer 701 are differentiated from each other, the beamwidths overlap each other at the transmitting/receiving antennas of the beamformers 701 and 702, so that the beamwidth can vary.

Although only two beamformers are illustrated in FIG. 7, the number of beamformers is not limited thereto, and three or more beamformers can be used according to the particular application.

Figure 8:
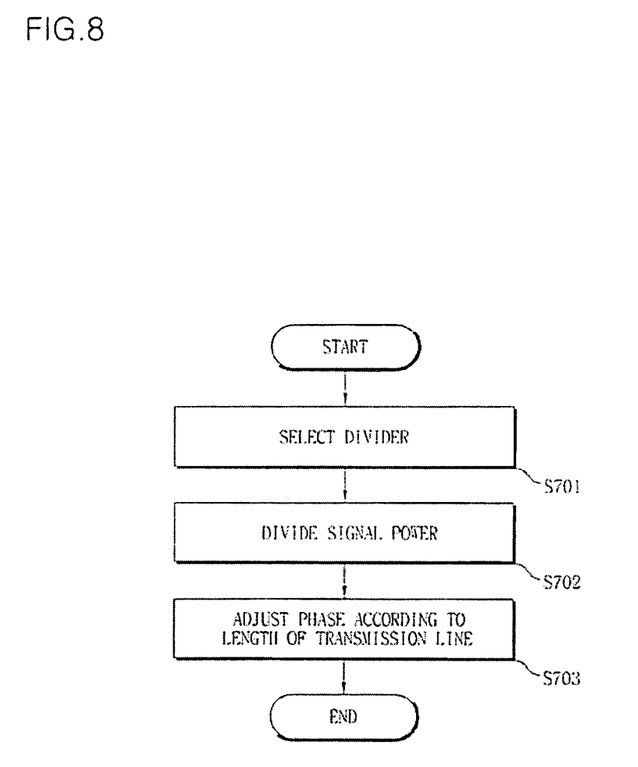
FIG. 8 is a flowchart of a beamforming method according to an embodiment.

FIG. 8 is a flowchart of a beamforming method according to an exemplary embodiment. First, a divider is selected (operation S701). A divider is selected from a plurality of dividers, each of which divides a signal into a plurality of paths, and outputs the divided signals. For example, in FIG. 1, the input switch 103 selects one of the several dividers 101 in response to a predetermined control signal.

Once the divider is selected, the selected divider splits the input signal into a plurality of paths (operation S702). For instance, if the divider is an N-way power divider that equally splits the power of the input signal to generate N output signals, the input signal can be divided into N output signals.

Subsequently, the phase of the divided signal is changed (operation S703). The phase change is carried out by the phase shifter described above (for example, the phase shifter 102 in FIG. 1). For instance, the input signals split into four paths may have their phases changed according to lengths of the corresponding transmission lines 302 while passing through the transmission lines 302 on the phase shifter 102.

Moreover, in operation S703, a procedure of transmitting to a transmitting/receiving antenna the signals with their phases changed may be further included.

During this procedure, the degree of change in the phase of the signal can be variously set as need for the particular use, and it is possible to adjust the degree of change in the phase such that each signal has a different phase or all signals have an equal phase interval.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A beamformer, comprising:
a plurality of dividers, each of which is configured to receive and divide an input signal having a same frequency into a plurality of output signals output along a plurality of paths, respectively;
an input switch which selects one of the dividers such that the input signal is input to a selected divider;
a phase shifter which shifts phases of the output signals from the selected divider according to which divider is selected among the dividers; and
an output switch which transmits the phase-shifted output signals from the phase shifter to an antenna,
wherein the phase shifter comprises a plurality of phase shifting units each of which is configured to receive the output signals from the selected divider and shift phases of the output signals, and
wherein the plurality of phase shifting units are different from one another in configuration so that patterns of beams formed by the output signals phase-shifted at the phase shifting units are different from one another based on which of the plurality of dividers is selected by the input switch.

2. The beamformer of claim 1, wherein the phase shifter is formed in a multilayer structure in which a plurality of substrates are stacked on one another, a plurality of transmission lines through which the output signals flow being formed on each substrate.

3. The beamformer of claim 2, wherein the phase shifter changes a phase of each output signal from the selected divider according to a length of the each transmission line.

4. The beamformer of claim 2, wherein the dividers are located respectively in correspondence to the plurality of substrates in such a manner that each divider is connected to the transmission lines formed on a substrate to which the divider corresponds.

5. The beamformer of claim 2, wherein the transmission lines are at least one of microstrip lines and coplanar waveguide lines.

6. The beamformer of claim 2, wherein the output switch selects only signals that have passed the transmission lines on a selected one of the plurality of substrates, and transmits the selected signals to the antenna.

7. The beamformer of claim 1, wherein each divider is an N-way power divider that equally divides a power of the input signal to generate N output signals.

8. The beamformer of claim 1, wherein the output signals from the phase shifter have different phases from one another.

9. A beamformer formed by overlaying two or more beamformers of claim 1 to provide at least one of double polarization and a variable beamwidth.

10. The beamformer of claim 9, wherein the two or more beamformers are stacked on one another.

11. A beamformer, comprising:
a plurality of dividers, each of which is configured to receive and divide an input signal having a same frequency into a plurality of output signals along a plurality of paths, respectively;
a phase shifter which has a plurality of substrates stacked on one another, each substrate having transmission lines formed thereon for output signals from at least one of the plurality of dividers to flow therethrough, changing a phase of each of the output signals from the at least one of the plurality of dividers according to a length of each transmission line; and
an input switch which selects one of the plurality of dividers,
wherein each of the plurality of phase substrates is configured to receive output signals from the selected divider and shift phases of the received output signals, and
wherein the plurality of substrates are different from one another in configuration so that patterns of beams formed by the output signals phase-shifted at the plurality of substrates are different from one another based on which of the plurality of dividers is selected by the input switch.

12. The beamformer of claim 11, further comprising:
an output switch which selects only signals that have passed through transmission lines of a selected one of the plurality of substrates, and which transmits the selected signals to a transmitting/receiving antenna.

13. The beamformer of claim 11, wherein the dividers are located respectively in correspondence to the plurality of substrates in such a manner that each divider is connected to the transmission lines formed on a substrate to which the divider corresponds.

14. The beamformer of claim 11, wherein each divider is an N-way power divider that equally divides a power of the input signal to generate N output signals.

15. The beamformer of claim 11, wherein signals output by the phase shifter have different phase from one another.

16. The beamformer of claim 11, wherein signals output by the phase shifter have an equal phase interval.

17. A beamformer formed by overlaying two or more beamformers of claim 11 to provide at least one of dual polarization and a variable beamwidth.

18. A beamformer, comprising:
a plurality of substrates;
a divider unit which is disposed on each of the substrates, and which is configured to receive and divide an input signal having a same frequency into a plurality of output signals output along a plurality of paths, respectively;
a phase shifting unit disposed on each of the substrates, the phase shifting unit being connected to the divider unit, and changing a phase of the output signals from the divider unit; and
a switch unit which selects one of the substrates,
wherein each of the substrates is configured to receive the output signals from a divider unit disposed on the selected substrate and shift phases of the output signals, and
wherein the substrates are different from one another in configuration so that patterns of beams formed by the output signals phase-changed at the phase shifting unit are different from one another based on which of the substrates is selected by the switch unit.

19. The beamformer of claim 18, wherein the divider unit is an N-way power divider which equally divides a power of the input signal to generate N output signals.

20. The beamformer of claim 18, wherein the phase shifting unit includes a plurality of transmission lines with different lengths, the phase shifting unit changing the phase of the output signal from the divider according to a length of the corresponding transmission line.

21. A beamforming method, comprising:
selecting one of a plurality of dividers, each of which is configured to receive and divide an input signal having a same frequency into a plurality of output signals output along a plurality of paths;
outputting the output signals from the selected one of the plurality of dividers; and
changing phases of the output signals,
wherein the changing of the phases includes transmitting the output signals, of which the phases have been changed, to a transmitting/receiving antenna, and the transmitted output signals having at least one of different phases and an equal phase interval.

* * * * *